(12) United States Patent
Locklin et al.

(10) Patent No.: US 12,146,080 B1
(45) Date of Patent: Nov. 19, 2024

(54) HOME COMPOSTABLE ADHESIVES AND METHODS FOR MAKING AND USING THE SAME

(71) Applicant: University of Georgia Research Foundation, Inc., Athens, GA (US)

(72) Inventors: Jason John Locklin, Bogart, GA (US); Branson W. Ritchie, Athens, GA (US); Evan Michael White, Athens, GA (US); Ethan Jacob Stinchcomb, Athens, GA (US)

(73) Assignee: UNIVERSITY OF GEORGIA RESEARCH FOUNDATION, INC., Athens, GA (US)

( * ) Notice: Subject to any disclaimer, the term of this patent is extended or adjusted under 35 U.S.C. 154(b) by 0 days.

(21) Appl. No.: 18/628,937

(22) Filed: Apr. 8, 2024

(51) Int. Cl.
| | | |
|---|---|---|
| *C09J 167/02* | (2006.01) | |
| *B32B 7/12* | (2006.01) | |
| *B32B 27/36* | (2006.01) | |
| *C08G 63/02* | (2006.01) | |
| *C08G 63/12* | (2006.01) | |
| *C08G 63/16* | (2006.01) | |
| *C09J 7/38* | (2018.01) | |

(52) U.S. Cl.
CPC ............... *C09J 167/02* (2013.01); *C09J 7/38* (2018.01); *B32B 7/12* (2013.01); *B32B 27/36* (2013.01); *B32B 2307/7163* (2013.01); *B32B 2439/00* (2013.01); *B32B 2439/70* (2013.01); *B32B 2519/00* (2013.01); *C08G 63/02* (2013.01); *C08G 63/12* (2013.01); *C08G 63/16* (2013.01); *C08G 2230/00* (2013.01); *C09J 2203/334* (2013.01); *C09J 2301/302* (2020.08); *C09J 2301/312* (2020.08); *C09J 2301/408* (2020.08); *C09J 2467/00* (2013.01)

(58) Field of Classification Search
None
See application file for complete search history.

(56) References Cited

U.S. PATENT DOCUMENTS

| | | | | |
|---|---|---|---|---|
| 5,589,566 | A | * 12/1996 | White | .................... C08G 63/85 |
| | | | | 528/274 |
| 5,750,605 | A | * 5/1998 | Blumenthal | ........... C09J 191/06 |
| | | | | 524/277 |
| 7,868,101 | B2 | 1/2011 | Lewis et al. | |

(Continued)

FOREIGN PATENT DOCUMENTS

| | | | |
|---|---|---|---|
| CN | 111808522 | A * | 10/2020 |
| CN | 117801718 | A * | 4/2024 |

(Continued)

*Primary Examiner* — Vivian Chen
(74) *Attorney, Agent, or Firm* — Thomas | Horstemeyer, LLP

(57) ABSTRACT

Described herein are home compostable adhesives composed of a polyester. The adhesives described herein have widespread commercial applicability as a compostable alternative to current non-biodegradable adhesives such as, for example, pressure sensitive adhesives. In one aspect, the polyester includes
a plurality of residues of a diol selected from the group consisting of 1,3-propanediol, 1,4-butanediol, or a combination thereof;
a plurality of residues of a first dicarboxylic consisting of succinic acid;
a plurality of residues of a second dicarboxylic consisting of glutaric acid; and
a plurality of residues of a sugar.

28 Claims, 4 Drawing Sheets

(56) References Cited

U.S. PATENT DOCUMENTS

| | | | |
|---|---|---|---|
| 9,951,260 B2 | 4/2018 | Li et al. | |
| 10,941,240 B2 | 3/2021 | Terwillegar et al. | |
| 2010/0330315 A1* | 12/2010 | Robert | C09J 167/04 524/270 |
| 2015/0045488 A1* | 2/2015 | Takenaka | C09J 167/02 524/505 |
| 2015/0197676 A1* | 7/2015 | Takenaka | C09J 7/383 525/190 |
| 2020/0007998 A1 | 1/2020 | Rucker et al. | |
| 2020/0231730 A1* | 7/2020 | Misawa | B32B 27/22 |
| 2020/0339781 A1* | 10/2020 | LaPray | C08K 5/1545 |
| 2022/0098446 A1* | 3/2022 | Kauffman | A61F 13/0253 |
| 2023/0092087 A1* | 3/2023 | Schumacher | B32B 27/36 156/331.7 |
| 2023/0167225 A1* | 6/2023 | Mayfield | C08G 18/73 528/85 |

FOREIGN PATENT DOCUMENTS

| | | | |
|---|---|---|---|
| JP | 06-322081 A | * | 11/1994 |
| JP | 2020-105410 A | * | 7/2020 |
| KR | 2024-0027345 A | * | 3/2024 |
| WO | WO 99/23187 A | * | 5/1999 |
| WO | 2023230469 A1 | | 11/2023 |

* cited by examiner

HOME COMPOSTABLE ADHESIVES AND METHODS FOR MAKING AND USING THE SAME

BACKGROUND

Adhesives such as pressure sensitive adhesives have widespread commercial applicability. However, adhesives are generally composed of materials that are non-biodegradable or compostable and, thus persistent in the environment. Thus, a need exists for compostable adhesives suitable for use in a wide variety of applications. Advantageously, the adhesive would include all the mechanical and physical properties of adhesives currently used but would break down rapidly and with minimal environmental impact upon disposal.

SUMMARY

Described herein are home compostable adhesives composed of a polyester. The adhesives described herein have widespread commercial applicability as a compostable alternative to current non-biodegradable adhesives such as, for example, pressure sensitive adhesives. In one aspect, the polyester includes
- (a) a plurality of residues of a diol selected from the group consisting of 1,3-propanediol, 1,4-butanediol, or a combination thereof;
- (b) a plurality of residues of a first dicarboxylic consisting of succinic acid;
- (c) a plurality of residues of a second dicarboxylic consisting of glutaric acid; and
- (d) a plurality of residues of a sugar.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

Figure 1:
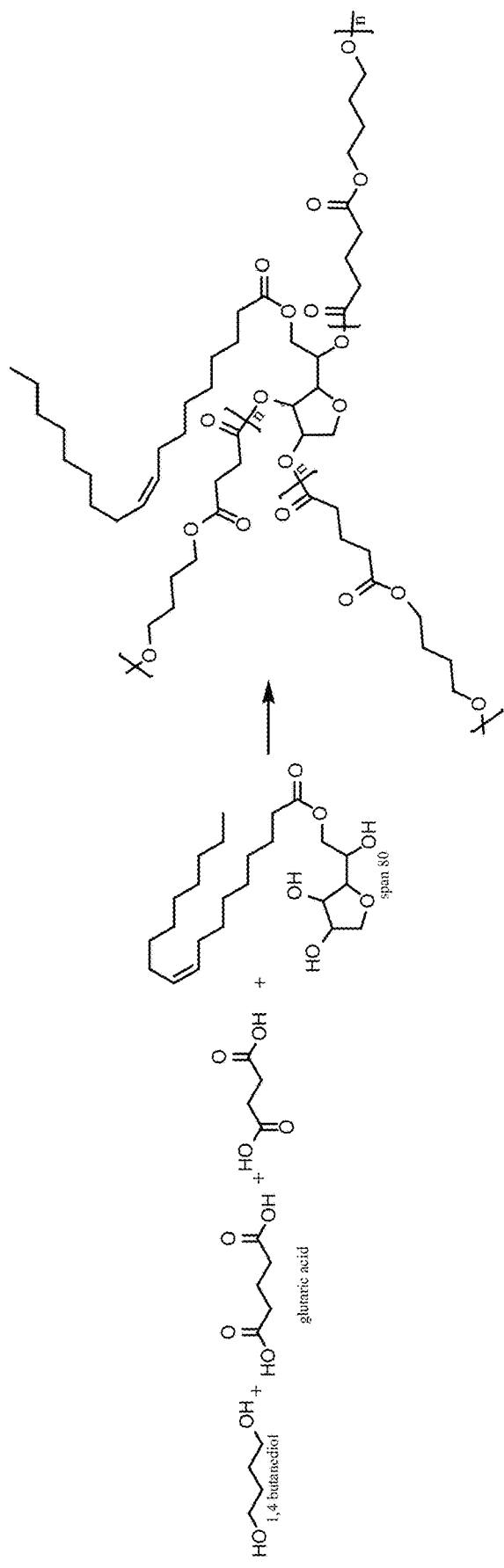
FIG. 1 provides an exemplary synthetic scheme for producing a polyester described herein.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," "having," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a pharmaceutically acceptable carrier" includes, but is not limited to, mixtures or combinations of two or more such carriers, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions disclosed herein as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As used herein, the terms "optional" or "optionally" means that the subsequently described event or circumstance can or cannot occur, and that the description includes instances where said event or circumstance and instances where it does not.

As used herein, a "residue" of a chemical species, refers to the moiety that is the resulting product of the chemical species in a particular reaction scheme or subsequent formulation or chemical product, regardless of whether the moiety is actually obtained from the chemical species. For example, a residue of 1,3-propanediol in a polyester refers to one or more —OCH$_2$CH$_2$CH$_2$O— units in the polyester, regardless of whether 1,3-propanediol was used to prepare the polyester. Similarly, a glutaric acid residue in a polyester refers to one or more —CO(CH$_2$)$_3$CO— moieties in the polyester, regardless of whether the residue is obtained by reacting glutaric acid or an ester thereof to obtain the polyester.

As used herein, "home compostable" refers to a material that that satisfies the requirements under AS 5810/EN 17427 or TÜV AUSTRIA OK Compost Home standards.

As used herein, "pressure sensitive adhesive or PSA" refers to a nonreactive adhesive that forms a bond when pressure is applied to bond the adhesive with a surface. No solvent, water, or heat is needed to activate the adhesive.
Home Compostable Adhesives and Methods for Making and Using the Same Described herein are home compostable adhesives composed of a polyester. By varying the components used to produce the polyester, the mechanical and physical properties of the polyester can be modified such that the adhesive is home compostable. The adhesives described herein have widespread commercial applicability as a compostable alternative to current non-biodegradable adhesives such as, for example, pressure sensitive adhesives.

The polyesters described herein have a low glass transition temperature, which makes them suitable as compostable adhesives. In one aspect, the polyester has a glass transition temperature of less than about 25° C. as determined by differential scanning calorimetry. In another aspect, the polyester has a glass transition temperature of −80° C. to less than about 25° C. as determined by differential scanning calorimetry, or −80° C., −70° C., −60° C., −50° C., −40° C., −30° C., −20° C., −10° C., 0° C., 10° C., 20° C., or less than 25° C., where any value can be a lower and upper endpoint of a range (e.g., −20° C. to 20° C.).

The polyesters described herein are amorphous, which also makes them suitable as home compostable adhesives. In one aspect, the polyester has a crystallinity of 0.10% to less than about 10% as determined by differential scanning calorimetry, or 0.1%, 0.5%, 0.10%, 0.15%, 0.20%, 0.25%, 0.30%, 0.35%, 0.40%, 0.45%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, or less than 10%, where any value can be a lower and upper endpoint of a range (e.g., 0.10% to 0.30%).

In one aspect, the polyester includes
(a) a plurality of residues of a diol selected from the group consisting of 1,3-propanediol, 1,4-butanediol, or a combination thereof;
(b) a plurality of residues of a first dicarboxylic consisting of succinic acid;
(c) a plurality of residues of a second dicarboxylic consisting of glutaric acid; and
(d) a plurality of residues of a sugar.

In one aspect, the diol is 1,4-butanediol. In another aspect, the diol is 1,3-propanediol. In another aspect, the diol is 1,4-butanediol and 1,3-propanediol. In one aspect, when the diol is 1,4-butanediol and 1,3-propanediol, the molar ratio of the 1,4-butanediol to 1,3-propanediol is from 4:1 to 7:1. In another aspect, the molar ratio of the 1,4-butanediol to 1,3-propanediol is 4:1, 4.5:1, 5:1, 5.5:1, 6:1, 6.5:1, or 7:1, where any value can be a lower and upper endpoint of a range (e.g., 5:1 to 6:1).

Not wishing to be bound by theory, modifying the relative amount of 1,4-butanediol to 1,3-propanediol can impact the rheological and thermal transitions of the polyester. In one aspect, if the adhesive is used in applications above 4° C., the diol component is 100% 1,4-butanediol. In another aspect, if the adhesive is used in applications above −6° C., the diol component is 1,4-butanediol and 1,3-propanediol, where the molar ratio of the 1,4-butanediol to 1,3-propanediol is from 5:1 to 6:1.

The polyesters described herein are produced with at least two different carboxylic acids. In one aspect, the first dicarboxylic acid is succinic acid and the second carboxylic acid is glutaric acid.

In one aspect, the molar ratio of the first dicarboxylic acid to the second dicarboxylic acid is from 1:1 to 1:5. In another aspect, the molar ratio of the first dicarboxylic acid to the second dicarboxylic acid is 1:1, 1:1.5, 1:2, 1:2.5, 1:3, 1:3.5, 1:4, 1:4.5, or 1:5, where any value can be a lower and upper endpoint of a range (e.g., 1:2 to: 1:3).

In one aspect, the molar ratio of the sum of the first dicarboxylic acid and the second dicarboxylic acid to the diol is from 1:10 to 1:1. In another aspect, the molar ratio of the sum of the first dicarboxylic acid and the second dicarboxylic acid to the diol is from 1:10, 1:9, 1:8, 1:7, 1:6, 1:5, 1:4, 1:3, 1:2, or 1:1, where any value can be a lower and upper endpoint of a range (e.g., 1:5 to 1:3).

In another aspect, the molar percentage of hydroxyl groups present in the diol component is greater than the molar percentage of carboxylic acid groups present in the first and second dicarboxylic acids. In one aspect, the molar percentage of hydroxyl groups present in the diol component is up to 5% greater than the molar percentage of carboxylic acid groups present in the first and second dicarboxylic acids. In another aspect, the molar percentage of hydroxyl groups present in the diol component is greater than 0%, 1%, 2%, 3%, 4%, 5%, 6%, 7%, 8%, 9%, or up to 10% greater than the molar percentage of carboxylic acid groups present in the first and second dicarboxylic acids, where any value can be a lower and upper endpoint of a range (e.g., 1% to 5%).

The polyesters described herein also include a sugar component. The sugar component performs as a crosslinker, and is chemically incorporated in the polyester. Not wishing to be bound by theory, the sugar content can be used to modify the rheological and adhesive properties of the polyester. For example, a lower sugar content can decrease the viscous properties of the polyester and decreases the elastic properties of the polyester. In another aspect, a lower sugar content results in a polyester with higher instant tack when measuring loop tack and 90 peel while having an increase in cohesive vs adhesive failure. In another aspect, increasing the sugar content increases the elastic component of the polyester while increasing the viscosity of the polyester. In another aspect, a higher sugar content improves the internal strength of the adhesive and decreases cohesive failure while decreasing the force of adhesive action with lower loop tack and 90 peel values.

In one aspect, the sugar has at least two hydroxyl groups per sugar molecule. In another aspect, the sugar has 2, 3, or 4 hydroxyl groups per sugar molecule. In another aspect, the sugar is present in an amount greater than 0 mole percent to 15 mole percent hydroxyl content. The total hydroxyl content is the sum of the mole percent of hydroxyl groups derived from the diol plus the mole percent hydroxyl groups derived from the sugar. For example, if 3 moles of diol and 1 mole of a sugar with two hydroxyl groups per sugar molecule are used to produce the polyester, the sugar is present in an amount of 25% based on hydroxyl content. In one aspect, the sugar is present in the polyester in an amount of a greater than 0 mole percent to 15 mole percent hydroxyl content, or greater than 0%, 0.1%, 0.5%, 1%, 2%, 3%, 4%, 5%, 6%, 7%, 8%, 9%, 10%, 11%, 12%, 13%, 14%, or 15%, where any value can be a lower and upper endpoint of a range (e.g., 7% to 11%). In one aspect, when the adhesive is a pressure sensitive adhesive, the sugar is present in the polyester in an amount of 4 mole percent to 8 mole percent hydroxyl content, preferably 5 mole percent to 7 mole percent hydroxyl content.

In one aspect, the sugar can be a monosaccharide (e.g., sucrose, fructose, galactose, xylose, mannose), disaccharide (e.g., sucrose), or oligosaccharide having at least two hydroxyl groups present in the sugar molecule. In another aspect, the sugar is sorbitan or a derivative thereof. Sorbitan has four hydroxyl groups where one or two of the hydroxyl groups can be substituted with a functional group. In one aspect, one or two hydroxyl groups are substituted with an alkyl substituted carboxyl group. For example, sorbitan can be reacted with one or two moles of a saturated or unsaturated fatty acid to produce a sorbitan derivative useful in producing the polyesters described herein. In one aspect, the fatty acid is a C10-C20 saturated or unsaturated fatty acid. In one aspect, the sugar is sorbitan monooleate, sorbitan monolaurate, sorbitan monostearate, or sorbitan monopalmitate.

The polyester described herein can be produced by mixing the diol, the first dicarboxylic acid, the second dicarboxylic acid, and the sugar followed by heating the mixture for a sufficient time to ensure the reaction is complete. In one aspect, the reaction is conducted at a temperature of from about 100° C. to about 200° C. for 0.1 hours to about 5 hours. The Examples provide non-limiting procedures for making the polyesters described herein.

In one aspect, the adhesives described herein consists essentially of or consists of the polyesters described herein. For example, the adhesive can consist essentially of or consists of the polyester with out additional components such as, for example, a tackifier, a solvent (e.g., organic solvents or water), or additional polymers typically used to prepare adhesives.

In other aspect, the polyesters described herein can be used in combination with one or more additional components to produce home compostable adhesives with desired physical and mechanical properties. In one aspect, one or more additives can be combined with the polyesters described herein to modify the rheological, processing, and adhesive properties of the adhesive. In one aspect, the adhesive includes up to 50 weight percent of one or more additives. In another aspect, the adhesive includes greater than 0 weight percent and up to 50 weight percent of one or more additives, or greater than 0 weight percent, 5 weight percent, 10 weight percent, 15 weight percent, 20 weight percent, 25 weight percent, 30 weight percent, 35 weight percent, 40 weight percent, 45 weight percent, or up to 50 weight percent, where any value can be a lower and upper endpoint of a range (e.g., 10 weight percent to 30 weight percent).

In one aspect, the additive does not mineralize below 25° C. during home composting. In one aspect, the additive includes a UV absorber, an antioxidant, a viscosity modifier, a thixotropic agent, a hardener, a wax, a tackifier, a plasticizer, or any combination thereof.

A ultraviolet absorber (UVA) is used to improve light resistance of the adhesives described herein. Examples of useful UVAs include those described above in conjunction with multilayer film substrates (for example, those available from Ciba Specialty Chemicals Corporation under the trade designations "TINUVIN 328", "TINUVIN 326", "TINUVIN 783", "TINUVIN 770", "TINUVIN 479", "TINUVIN 928", and "TINUVIN 1577").

The antioxidant prevents oxidative degradation of the adhesives described herein. Examples of the antioxidant include a phenolic antioxidant, a phosphorus antioxidant, a sulfur antioxidant, and an amine antioxidant, and at least one selected from these antioxidants may be used. In particular, a phenolic antioxidant is preferred.

Examples of the phenolic antioxidant include monocyclic phenol compounds such as 2,6-di-tert-butyl-p-cresol, 2,6-di-tert-butyl-4-ethylphenol, 2,6-dicyclohexyl-4-methylphenol, 2,6-diisopropyl-4-ethylphenol, 2,6-di-tert-amyl-4-methylphenol, 2,6-di-tert-octyl-4-n-propylphenol, 2,6-dicyclohexyl-4-n-octylphenol, 2-isopropyl-4-methyl-6-tert-butylphenol, 2-tert-butyl-4-ethyl-6-tert-octylphenol, 2-isobutyl-4-ethyl-6-tert-hexylphenol, 2-cyclohexyl-4-n-butyl-6-isopropylphenol, a mixed cresol modified with styrene, DL-α-tocopherol, and stearyl β-(3,5-di-tert-butyl-4-hydroxyphenyl)propionate; bicyclic phenol compounds such as 2,2'-methylenebis(4-methyl-6-tert-butylphenol), 4,4'-butylidenebis(3-methyl-6-tert-butylphenol), 4,4'-thiobis (3-methyl-6-tert-butylphenol), 2,2'-thiobis(4-methyl-6-tert-butylphenol), 4,4'-methylenebis(2,6-di-tert-butylphenol), 2,2'-methylenebis[6-(1-methylcyclohexyl)-p-cresol], 2,2'-ethylidenebis(4,6-di-tert-butylphenol), 2,2'-butylidenebis(2-tert-butyl-4-methylphenol), 3,6-dioxaoctamethylenebis[3-(3-tert-butyl-4-hydroxy-5-methylphenyl)propionate], triethyleneglycol bis[3-(3-tert-butyl-5-methyl-4-hydroxyphenyl)propionate], 1,6-hexanediol bis[3-(3,5-di-tert-butyl-4-hydroxyphenyl)propionate], and 2,2'-thiodiethylenebis[3-(3,5-di-tert-butyl-4-hydroxyphenyl)propionate]; tricyclic phenol compounds such as 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris[(3,5-di-tert-butyl-4-hydroxyphenyl)propionyloxyethyl] isocyanurate, tris(4-tert-butyl-2,6-dimethyl-3-hydroxybenzyl)isocyanurate, and 1,3,5-trimethyl-2,4,6-tris (3,5-di-tert-butyl-4-hydroxybenzyl)benzene; tetracyclic phenol compounds such as tetrakis[methylene-3-(3,5-ditert-butyl-4-hydroxyphenyl)propionate]methane; and phosphorus-containing phenol compounds such as potassium bis(ethyl 3,5-di-tert-butyl-4-hydroxybenzylphosphonate) and nickel bis(ethyl 3,5-di-tert-butyl-4-hydroxybenzylphosphonate).

Examples of the phosphorus antioxidant include trioctyl phosphite, trilauryl phosphite, tristridecyl phosphite, trisisodecyl phosphite, phenyl diisooctyl phosphite, phenyl diisodecyl phosphite, phenyl di(tridecyl)phosphite, diphenyl isooctyl phosphite, diphenyl isodecyl phosphite, diphenyl tridecyl phosphite, triphenyl phosphite, tris(nonylphenyl) phosphite, tris(2,4-di-tert-butylphenyl)phosphite, tris(butoxyethyl)phosphite, tetratridecyl-4,4'-butylidenebis(3-methyl-6-tert-butylphenol)diphosphite, 4,4'-isopropylidenediphenol alkyl phosphite (wherein the alkyl group has about 12 to about 15 carbon atoms), 4,4'-isopropylidenebis(2-tert-butylphenol)di(nonylphenyl)phosphite, tris(biphenyl)phosphite, tetra(tridecyl)-1,1,3-tris(2-methyl-5-tert-butyl-4-hydroxyphenyl)butane diphosphite, tris(3,5-di-tert-butyl-4-hydroxyphenyl)phosphite, hydrogenated 4,4'-isopropylidenediphenol polyphosphite, bis(octylphenyl)bis[4,4'-butylidenebis(3-methyl-6-tert-butylphenol)]1,6-hexanediol diphosphite, hexatridecyl-1,1,3-tris(2-methyl-4-hydroxy-5-tert-butylphenyl)diphosphite, tris[4,4'-isopropylidenebis(2-tert-butylphenol)]phosphite, tris(1,3-distearoyloxyisopropyl)phosphite, 9,10-dihydro-9-phosphaphenanthrene-10-oxide, tetrakis(2,4-di-tert-butylphenyl)-4,4'-biphenylene diphosphonite, distearyl pentaerythritol diphosphite, di(nonylphenyl)pentaerythritol diphosphite, phenyl 4,4,'-isopropylidenediphenol pentaerythritol diphosphite, bis(2,4-di-tert-butylphenyl)pentaerythritol diphosphite, bis(2,6-di-tert-butyl-4-methylphenyl)pentaerythritol diphosphite, and phenylbisphenol-A-pentaerythritol diphosphite.

Dialkyl thiodipropionates and polyhydric alcohol esters of alkylthiopropionic acid are preferably used as sulfur antioxidants. Dialkyl thiodipropionates having an alkyl group of 6 to 20 carbon atoms are preferably used in the present invention. Polyhydric alcohol esters of alkylthiopropionic acid preferably have an alkyl group of 4 to 20 carbon atoms. In this case, examples of the polyhydric alcohol for forming the polyhydric alcohol esters include glycerol, trimethylolethane, trimethylolpropane, pentaerythritol, and trishydroxyethyl isocyanurate. Examples of such dialkyl thiodipropionates include dilauryl thiodipropionate, dimyristyl thiodipropionate and distearyl thiodipropionate. Examples of polyhydric alcohol esters of alkylthiopropionic acid include glycerol tributylthiopropionate, glycerol trioctylthiopropionate, glycerol trilaurylthiopropionate, glycerol tristearylthiopropionate, trimethylolethane tributylthiopropionate, trimethylolethane trioctylthiopropionate, trimethylolethane trilaurylthiopropionate, trimethylolethane tristearylthiopropionate, pentaerythritol tetrabutylthiopropionate, pentaerythritoltetraoctylthiopropionate, pentaerythritol tetralaurylthiopropionate, and pentaerythritol tetrastearylthiopropionate.

Examples of the amine antioxidant include bis(2,2,6,6-tetramethyl-4-piperidyl)sebacate, polycondensates of dimethyl succinate and 1-(2-hydroxyethyl)-4-hydroxy-2,2,6,6-tetramethylpiperidineethanol, N,N',N'',N'''-tetrakis(4,6-bis(butyl-(N-methyl-2,2,6,6-tetramethylpiperidine-4-yl)amino)-triazine-2-yl)-4,7-diazadecane-1,10-diamine, polycondensates of dibutylamine-1,3,5-triazine-N,N'-bis(2,2,6,6-tetramethyl-4-piperidyl)-1,6-hexamethylenediamine and N-(2,2,6,6-tetramethyl-4-piperidyl)butylamine, poly[{6-1,1,3,3-tetramethylbutyl)amino-1,3,5-triazine-2,4-diyl}{(2,2,6,6-tetramethyl-4-piperidyl)imino}hexamethylene {(2,2,6,6-tetramethyl-4-piperidyl)imino}], tetrakis(2,2,6,6-tetramethyl-4-piperidyl)-1,2,3,4-butanetetracarboxylate, 2,2,6,6-tetramethyl-4-piperidyl benzoate, bis(1,2,6,6-pentamethyl-4-piperidyl)-2-(3,5-di-tert-butyl-4-hydroxybenzyl)-2-n-butyl malonate, bis(N-methyl-2,2,6,6-tetramethyl-4-piperidyl)sebacate, 1,1'-(1,2-ethanediyl)-bis(3,3,5,5-tetramethylpiperadinone), (mixed 2,2,6,6-tetramethyl-4-piperidyl/tridecyl)-1,2,3,4-butanetetracarboxylate, (mixed 1,2,2,6,6-pentamethyl-4-piperidyl/tridecyl)-1,2,3,4-butanetetracarboxylate, mixed [2,2,6,6-tetramethyl-4-piperidyl/8,8,8',8'-tetramethyl-3,9-[2,4,8,10-tetraoxaspiro(5,5)undecane]diethyl]-1,2,3,4-butanetetracarboxylate, mixed [1,2,2,6,6-pentamethyl-4-piperidyl/8,8,8',8'-tetramethyl-3,9-[2,4,8,10-tetraoxaspiro (5,5)undecane]diethyl]-1,2,3,4-butanetetracarboxylate, condensates of N,N'-bis(3-aminopropyl)ethylenediamine-2,4-bis[N-butyl-N-(1,2,2,6,6-pentamethyl-4-piperidyl)amino]-6-chloro-1,3,5-triazine, poly[6-N-morpholyl-1,3,5-triazine-2,4-diyl][(2,2,6,6-tetramethyl-4-piperidyl)imino]hexamethylene[(2,2,6,6-tetramethyl-4-piperidyl)imide], condensates of N,N'-bis(2,2,6,6-tetramethyl-4-piperidyl) hexamethylenediamine and 1,2-dibromoethane, and [N-(2,2,6,6-tetramethyl-4-piperidyl)-2-methyl-2-(2,2,6,6-tetramethyl-4-piperidyl)imino]propionamide.

Viscosity modifiers are additives that can alter the flow properties of the adhesives described herein. Examples of viscosity modifiers include, but are not limited to, natural gums, cellulosics (e.g., hydroxyethyl cellulose, methylcellulose, methyl hydroxypropylmethyl cellulose, sodium carboxymethyl cellulose), alkali-soluble and alkali swellable emulsions (ASE), hydrophobically modified alkali swellable emulsions (HASE), hydrophobically modified ethoxylated urethanes (HEUR), castor oil derivatives, polyamides, calcium sulfonate derivatives, modified polyurea, organoclays and minerals, and polysiloxanes.

Examples of suitable thixotropic agents and thickeners include, but are not limited to, compounds such as diethylene glycol, monoalkyl ether, butanone oxime, methyl ethyl ketone oxime, nonylphenol, phenol and cresol; caprolactam, diisopropylamine, 1,2,4 triazole and 3, Examples include amine-containing compounds such as 5-dimethylpyrazole; and aliphatic-containing compounds such as dialkyl malonates.

Examples of suitable plasticizers include, but are not limited to, dioctyl phthalate or dibutyl phthalate, partially hydrogenated terpenes commercially available as "HB-40", trioctyl phosphate, epoxy plasticizers, toluene sulfamides, chloroparaffins, adipic acid esters, castor oil, toluene, alkyl phthalates such as alkyl naphthalene, tributyl citrate, acetyl tri-n-butyl citrate (ATBC), polymethylmethacrylate, polydimethyisiloxane, and hexadimethylsilazane.

Examples of suitable plasticizers include, but are not limited to, a fatty acid ester or a phosphate ester having 8 to 30 carbon atoms. Examples of fatty acid esters having 8 to 30 carbon atoms include esters of mono- or polybasic acids having 6 to 18 carbon atoms and branched alcohols having 18 or less carbon atoms, unsaturated fatty acids or branching acids having 14 to 18 carbon atoms and tetravalent acids. The following esters of alcohols, esters of mono- or polybasic acids having 6 to 18 carbon atoms and polyalkylene glycols, fatty acid esters obtained by epoxidizing unsaturated sites with peroxides, and the like. Examples of the ester of a mono- or poly-acid having 6 to 18 carbons and a branched alcohol having 18 or less carbon include, for example, isostearyl laurate, isopropyl myristate, isocetyl myristate, Octyldodecyl myristate, isostearyl palmitate, isocetyl stearate, octyldodecyl oleate, diisostearyl adipate, diisosuccinate Cetyl ester, triolenylidene trimellitate, and triisocetyl trimellitate. The following compounds are exemplified as the unsaturated fatty acid having 14 to 18 carbon atoms or an ester of a branched acid and an alcohol having a tetravalent or lower value, and the unsaturated fatty acid having 14 to 18 carbon atoms and a branching acid and an alcohol having a tetravalent or less are exemplified below. Examples of unsaturated fatty acids or branched acids having 14 to 18 carbon atoms include myristic oleic acid, oleic acid, linoleic acid, hypolinolenic acid, isopalmitic acid, and isostearic acid. Examples of the alcohol having a tetravalent or lower value include ethylene glycol, propylene glycol, glycerin, trimethylolpropane, pentaerythritol, and sorbitan. Examples of the ester of a mono- or poly-acid having 6 to 18 carbon atoms and a polyalkylene glycol include dihexyl acid polyethylene glycol, di-2-ethylhexyl acid polyethylene glycol, and dilauric acid polyethylene. Ethylene glycol, polyethylene glycol dioleate, and diethylene glycol methyl ether adipic acid. Examples of fatty acid esters obtained by epoxidizing unsaturated sites with peroxide and the like include epoxidized fats such as epoxidized soybean oil, epoxidized linseed oil, and epoxidized cottonseed oil, and unsaturated carbons of 8 to 18. Compounds obtained by epoxidizing fatty acids, ester compounds with linear or branched alcohols having 1 to 6 carbon atoms, and the like. Examples of the phosphoric acid ester include phosphorous acid or phosphoric acid, and an ester compound with a linear or branched alcohol having 2 to 18 carbon atoms.

Examples of suitable tackifiers include, but are not limited to, terpene resins such as polyterpenes (e.g., α-pinene resins, β-pinene resins, and limonene resins) and aromatic-modified polyterpene resins (e.g, phenol-modified polyterpene resins), kumaraninden resins, and petroleum resins such as C5 hydrocarbon resins, C9 hydrocarbon resins, C5/C9 hydrocarbon resins, and dicyclopentadiene resins. The tackifier, which is a hydrocarbon resin, can be prepared from various petroleum-based raw materials. These raw materials include aliphatic hydrocarbons (mainly a mixture of trans-1,3-pentadiene, cis-1,3-pentadiene, 2-methyl-2-butene, dicyclopentadiene, cyclopentadiene, and cyclopentene, and the like. Of some other monomers, such as C5 monomers with the presence of some other monomers), aromatic hydrocarbons (mainly a mixture of vinyltoluene, dicyclopentadiene, inden, methylstyrene, styrene, and methylindene). C9 monomer with presence), or a mixture thereof. The tackifier derived from the C5 monomer is called a C5 hydrocarbon resin, and the tackifier derived from the C9 monomer is called a C9 hydrocarbon resin. Some tackifiers are derived from a mixture of C5 and C9 monomers, or from a blend of a C5-hydrocarbon tackifier and a C9-hydrocarbon tackifier. These tackifiers are sometimes referred to as C5/C9 hydrocarbon tackiliers. Any of these resins can be partially or completely hydrogenated to improve their color, their thermal stability, or their process compatibility.

Examples of suitable hardeners include, but are not limited to, an isocyanate hardener, an epoxy hardener, a melamine hardener, a carbodiimide hardener, an oxazoline hardener, an azindine hardener, and the like.

Examples of suitable waxes include, but are not limited to palm, soy, canola, areca, beeswax and other vegetable and animal waxes, with a preference for carnauba palm waxes.

In one aspect, the adhesives described herein are pressure sensitive adhesives. In one aspect, the adhesives described herein do not harden in response to evaporation of a solvent, or upon reaction with UV radiation, or due to a chemical reaction, or due to cooling. Instead, the adhesive may form a bond when light pressure is applied to marry the adhesive to an adherend. Without being bound by theory, it is believed that the bond forms because the adhesive is soft enough to flow or wet the adherend, but hard enough to resist flow when stress is applied to the bond. Once the adhesive and adherend are in proximity to one another, molecular interactions such as van der Waals forces may also contribute to the bond strength.

In another aspect, the adhesives described herein do not require that the surface of the adherent include an adhesive. For example, when the adhesive is placed in proximity with the surface of the adherend, the surface of the adherend is free of the adhesive.

The adhesives described herein may be permanent or removable. In one aspect, the adhesive is removable if removal of the adhesive from the adherend does not result in removal of material forming the surface of the adherend. When the adhesive is applied to the adherend in conjunction with a substrate, removing the substrate may remove a large proportion or substantially all of the adhesive from the surface of the adherend. In another embodiment, the adhesive may be repositionable, meaning that, after being bonded once to an adherend, it retains sufficient tack to be re-adhered to the same adherent in a different position or to a different adherend.

The adhesives described herein can be applied to numerous substrates and articles using techniques known in the art. In one aspect, the adhesives described herein can be applied to labels. Labels are used in numerous applications, and the home compostable adhesives described herein provide an environmentally-favorable alternative. In one aspect, the label is a produce label that is applied to raw fruit and vegetables. In another aspect, the label with the adhesive described herein can be used to apply to food packages such as for meat, poultry, fish, and cheese. The adhesives described herein can be applied to the label using techniques known in the art including spraying or rolling the adhesive to at least one surface of the label.

In another aspect, the adhesive described herein can be used to mark or label a package such as, for example, a food storage package. In one aspect, the method comprises applying an adhesive label to at least one surface of the package, wherein the adhesive label has at least one surface coated with an adhesive described herein. In another aspect, the method comprises (a) applying an adhesive described herein to at least one surface of the package and (b) applying a label to the adhesive on the at least one surface of the package.

Aspects

Aspect 1. A home compostable adhesive comprising a polyester, wherein the polyester comprises
- a plurality of residues of a diol selected from the group consisting of 1,3-propanediol, 1,4-butanediol, or a combination thereof;
- a plurality of residues of a first dicarboxylic consisting of succinic acid;
- a plurality of residues of a second dicarboxylic consisting of glutaric acid; and
a plurality of residues of a sugar.

Aspect 2. The adhesive of Aspect 1, wherein the diol is a combination of 1,3-propanediol and 1,4-butanediol.

Aspect 3. The adhesive of Aspect 1 or 2, wherein the molar ratio of the 1,4-butanediol to 1,3-propanediol is from 4:1 to 7:1.

Aspect 4. The adhesive of Aspect 1 or 2, wherein the molar ratio of the first dicarboxylic acid to the second dicarboxylic acid is from 1:1 to 1:5.

Aspect 5. The adhesive of Aspect 1 or 2, wherein the molar ratio of the sum of the first dicarboxylic acid and the second dicarboxylic acid to the diol is from 1:10 to 1:1.

Aspect 6. The adhesive of any one of Aspects 1-5, wherein the sugar is present in an amount of a greater than 0 mole percent to 15 mole percent hydroxyl content.

Aspect 7. The adhesive of any one of Aspects 1-6, wherein the sugar is a sorbitan or a fatty acid derivative thereof.

Aspect 8. The adhesive of any one of Aspects 1-6, wherein the sugar is sorbitan monooleate, sorbitan monolaurate, sorbitan monostearate, sorbitan monopalmitate, sorbitan, fructose, mannose, xylose, or any combination thereof.

Aspect 9. The adhesive of Aspect 1, wherein the diol is 1,4-butanediol and 1,3-propanediol, the first dicarboxylic acid is succinic acid, the second dicarboxylic acid is glutaric acid, and the sugar is sorbitan monooleate.

Aspect 10. The adhesive of Aspect 1, wherein the diol is 1,4-butanediol and 1,3-propanediol, the first dicarboxylic acid is succinic acid, the second dicarboxylic acid is glutaric acid, and the sugar is sorbitan monooleate, wherein
the molar ratio of the 1,4-butanediol to 1,3-propanediol is from 4:1 to 7:1;
the molar ratio of the first dicarboxylic acid to the second dicarboxylic acid is from 1:1 to 1:5 and
the molar ratio of the sum of the first dicarboxylic acid and the second dicarboxylic acid to the diol is from 1:10 to 1:1.

Aspect 11. The adhesive of any one of Aspects 1-10, wherein the polyester has a glass transition temperature of less than 25° C.

Aspect 12. The adhesive of any one of Aspects 1-11, wherein the polyester has a crystallinity of less than 10%.

Aspect 13. The adhesive of any one of Aspects 1-12, wherein the adhesive is a pressure sensitive adhesive.

Aspect 14. The adhesive of any one of Aspects 1-13, wherein the polyester is from about 50 weight percent to about 100 weight percent of the adhesive.

Aspect 15. The adhesive of any one of Aspects 1-14, wherein the adhesive further comprises a UV absorber, an antioxidant, a viscosity modifier, a thixotropic agent, a hardener, a wax, a tackifier, a plasticizer, or any combination thereof.

Aspect 16. The adhesive of any one of Aspects 1-14, wherein the adhesive does not include a tackifier, a solvent, or an additional polymer.

Aspect 17. The adhesive of any one of Aspects 1-16, wherein the polyester comprises the reaction product of a diol selected from the group consisting of 1,3-propanediol, 1,4-butanediol, or a combination thereof, a first dicarboxylic consisting of succinic acid; a second dicarboxylic consisting of glutaric acid; and a sugar.

Aspect 18. The adhesive of any one of Aspects 1-14, wherein the adhesive consists essentially of the polyester.

Aspect 19. The adhesive of any one of Aspects 1-14, wherein the adhesive consists of the polyester.

Aspect 20. A label comprising at least one surface, wherein the at least one surface comprises a coating comprising the home compostable adhesive of any one of Aspects 1-20.

Aspect 21. A food packaging system comprising the label of Aspect 20 adhered to the system.

Aspect 22. An article of food comprising the label of Aspect 20 adhered to the article of food.

Aspect 23. A polyester comprising
a plurality of residues of a diol selected from the group consisting of 1,3-propanediol, 1,4-butanediol, or a combination thereof;
a plurality of residues of a first dicarboxylic consisting of succinic acid;
a plurality of residues of a second dicarboxylic consisting of glutaric acid; and
a plurality of residues of a sugar.

Aspect 24. The polyester of Aspect 23, wherein the diol is a combination of 1,3-propanediol and 1,4-butanediol.

Aspect 25. The polyester of Aspect 23 or 24, wherein the molar ratio of the 1,4-butanediol to 1,3-propanediol is from 4:1 to 7:1.

Aspect 26. The polyester of Aspect 23 or 24, wherein the molar ratio of the first dicarboxylic acid to the second dicarboxylic acid is from 1:1 to 1:5.

Aspect 27. The polyester of Aspect 23 or 24, wherein the molar ratio of the sum of the first dicarboxylic acid and the second dicarboxylic acid to the diol is from 1:10 to 1:1.

Aspect 28. The polyester of any one of Aspects 23-27, wherein the sugar is present in an amount of a greater than 0 mole percent to 15 mole percent hydroxyl content.

Aspect 29. The polyester of any one of Aspects 23-28, wherein the sugar is a sorbitan or a fatty acid derivative thereof.

Aspect 30. The polyester of any one of Aspects 23-30, wherein the sugar is sorbitan monooleate, sorbitan monolaurate, sorbitan monostearate, sorbitan monopalmitate, sorbitan, fructose, mannose, xylose, or any combination thereof.

Aspect 31. The polyester of Aspect 23, wherein the diol is 1,4-butanediol and 1,3-propanediol, the first dicarboxylic acid is succinic acid, the second dicarboxylic acid is glutaric acid, and the sugar is sorbitan monooleate.

Aspect 32. The polyester of Aspect 23, wherein the diol is 1,4-butanediol and 1,3-propanediol, the first dicarboxylic acid is succinic acid, the second dicarboxylic acid is glutaric acid, and the sugar is sorbitan monooleate, wherein
the molar ratio of the 1,4-butanediol to 1,3-propanediol is from 4:1 to 7:1;
the molar ratio of the first dicarboxylic acid to the second dicarboxylic acid is from 1:1 to 1:5 and
the molar ratio of the sum of the first dicarboxylic acid and the second dicarboxylic acid to the diol is from 1:10 to 1:1.

Aspect 33. The polyester of any one of Aspects 23-32, wherein the polyester has a glass transition temperature of less than 25° C.

Aspect 34. The polyester of any one of Aspects 23-33, wherein the polyester has a crystallinity of less than 10%.

Aspect 35. The polyester of any one of Aspects 23-34, wherein the polyester comprises the reaction product of a diol selected from the group consisting of 1,3-propanediol, 1,4-butanediol, or a combination thereof, a first dicarboxylic consisting of succinic acid; a second dicarboxylic consisting of glutaric acid; and a sugar.

Examples

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Materials and Methods

Preparation of Polyester

Into a 50 L glass reactor equipped with a distillation apparatus, overhead stirrer with high sheer mixing blades, and thermocoupled heating, glutaric acid, succinic acid, 1,4 butanediol, 1,3 propanediol, and sorbitan monooleate are added under a nitrogen blanket. With nitrogen sparging into the material, the reaction is heated to 130 C and then ramped to 180 C at 10 C/hr and allowed to continue to react for 1 hour. A vacuum is then slowly applied to the reaction to a maximum vacuum allowed, operably below 10 torr preferably below 1 torr and allowed to react overnight. The reactor is then backfilled with nitrogen and a lewis acid transesterification catalyst is added, preferably zirconium n-butoxide (other catalysts may be used). A vacuum is then slowly applied to the reaction and the temperature is increased to 210° C. The reaction is allowed to continue until the determined rheological properties are achieved (4-12 hrs).

Differential Scanning Calorimetry

Approximately 10 mg of material is weighed into an aluminum sample pan and analyzed. The sample was then heated at 10° C./min to 120° C. The sample was then cooled to −60° C. at 10 C/min and then held isothermally for 30 minutes. The sample was then heated to 120 C at 10 C/min. The thermal transitions including melting point and glass transition temperature was determined from the second heating curve. Differential scanning calorimetry is completed to determine the thermal properties of the adhesive including melting temperature, degree of crystallinity, and glass transition temperature.

Adhesive Testing

Each adhesive sample was laminated to a face film and silicone release liner using a hot melt blade coater with an application temperature between 350 F and 400 F. The thickness of the adhesive film applied was varied based upon application demand.

90 Peel and Loop Tack Testing 90 peel was determined using ASTMD6862-11 and loop tack testing was determined by ASTM6195-03.

Rheological Properties

Rheological properties of the pressure sensitive adhesive are measured on parallel plate rheometer. Within the viscoelastic region the loss and storage moduli can be measured under oscillating conditions. The viscosity over the operable temperature is measured under flow conditions.

NMR Spectroscopy

Nuclear magnetic resonance imaging is completed to confirm the chemical structure of the resulting polymer and to determine monomer incorporation rate compared to feed rate.

Biodegradation Testing Under ASTM D5338-15, Industrial Composting Conditions

The polymer and a composition with additives were analyzed by respirometry evaluation at 58±1° C. under thermophilic composting conditions in accordance with ASTM D5338-15 (equivalent to ISO 14855 conditions).

Biodegradation Testing Under AS 5810/EN 17427 & TÜV AUSTRIA OK Compost Home Conditions Although home certification standards AS 5810 and TÜV AUSTRIA OK Compost Home permit testing at 25±5° C., biodegradation experiments were conducted under a modified test procedure of ASTM D5338-15/ISO 14855 conducted at 21±1° C. to ensure complete mineralization at the lowest permitted temperatures.

The inoculum used in biodegradation testing meets all requirements of ASTM D5338 § 9.1-9.3 & § 10.1-10.3 used in respirometry experiments. In general, respiration of the inoculum generated between 50 and 150 milligrams of $CO_2$ per day per 1 gram of volatile solids over ten days at 58° C. The resulting inoculum was sieved to less than 10 mm and used for experiments at 21±1° C. The inoculum was found to have an ash content of less than 70%, a pH between 7.0 and 8.2, and a water content between 45% and 50% at the time of pre-testing. The inoculum was analyzed for the concentrations of various metals through total acid digestion. Polymer and compositions were examined at 21±1° C. until both the samples and cellulose control mineralized completely (>90% and with a plateau in absolute biodegradation).

Results

The crosslinked polyester is produced through polycondensation and transesterification reactions. The monomers employed include a specific ratio of succinic acid, glutaric acid, 1,3 propanediol and 1,4 butanediol. Altering the monomer concentration alters the thermal and mechanical properties of the resulting polymer. For example, increasing the succinic acid concentration increases the crystallinity of the polymer leading to poor adhesive properties while also reducing the overall compostability of the polymer. Increasing or decreasing the 1,3 propanediol content alters the melting temperature of the polymer resulting in crystallization within the adhesive application temperature range (0° C.-45° C.) leading to unwanted debonding from target substrates. The crosslinker sorbitan monooleate improves the cohesive properties of the material. This crosslinker is added during the polycondensation reaction allowing for easy scale up of this material. The crosslinker content directly impacts the failure mechanism of the adhesive as either adhesive or cohesive failure. FIG. 1 provides a synthetic scheme for producing a copolyester useful herein.

Figure 2:
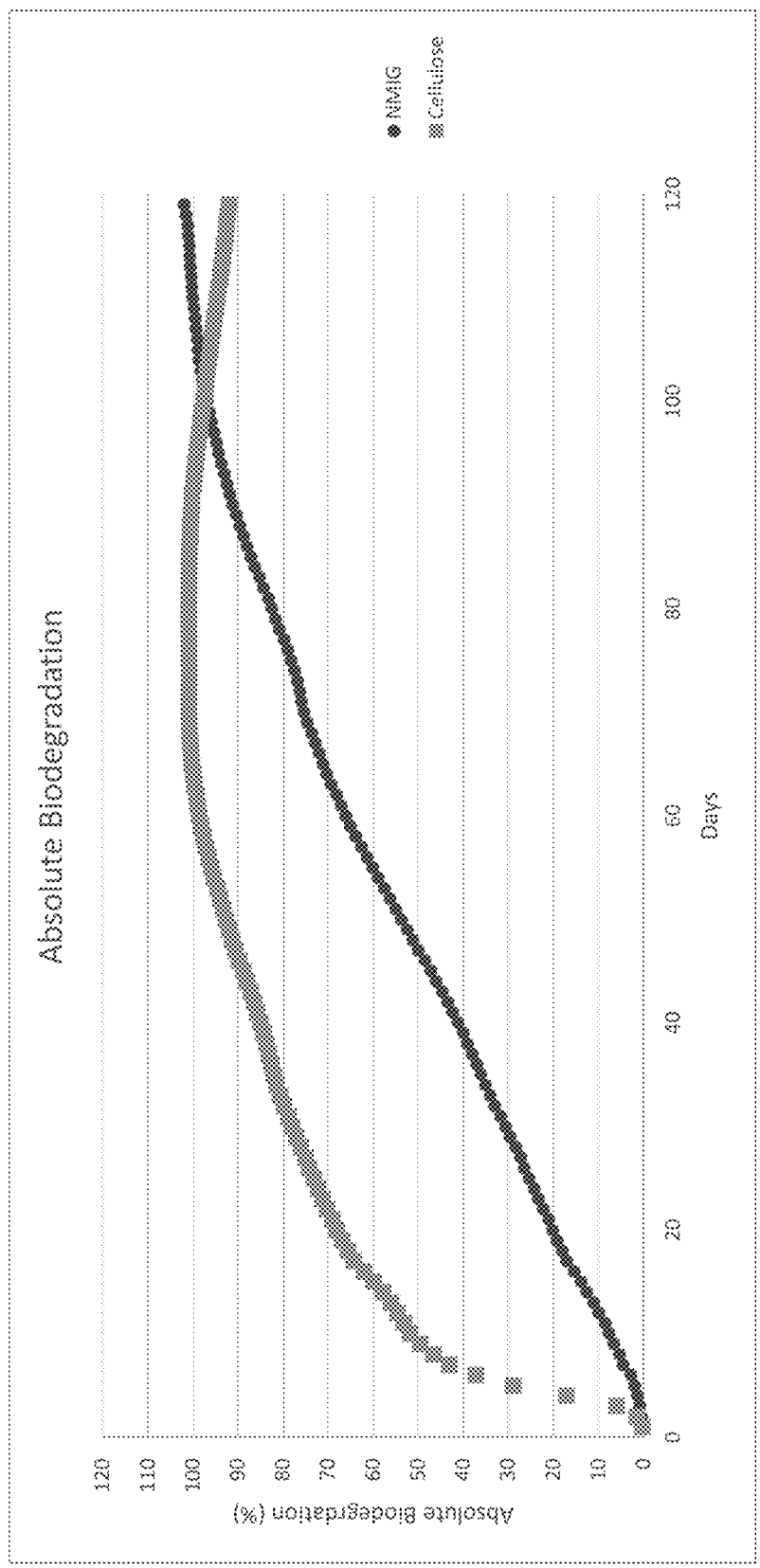
FIG. 2 shows the respirometry analysis of a home compostable adhesive described herein.

The crosslinked polyester was deliberately synthesized to meet the demand for a home compostable PSA. The standard for home compostability is not defined within the ASTM standards in the USA, but is outlined in AS 5810/EN 17427. Following the standard conditions, respirometry analysis was conducted during which the mineralization of all organic carbon within the polymeric material into $CO_2$ can be measured in a controlled environment. The home composting measurements were conducted in locally sourced compost at a controlled temperature of 21° C. To meet the home compostable standard, over 90% of the total organic carbon within the test material must be mineralized over 365 days. The PSA produced met this threshold within 90 days (FIG. 2).

Figure 3:
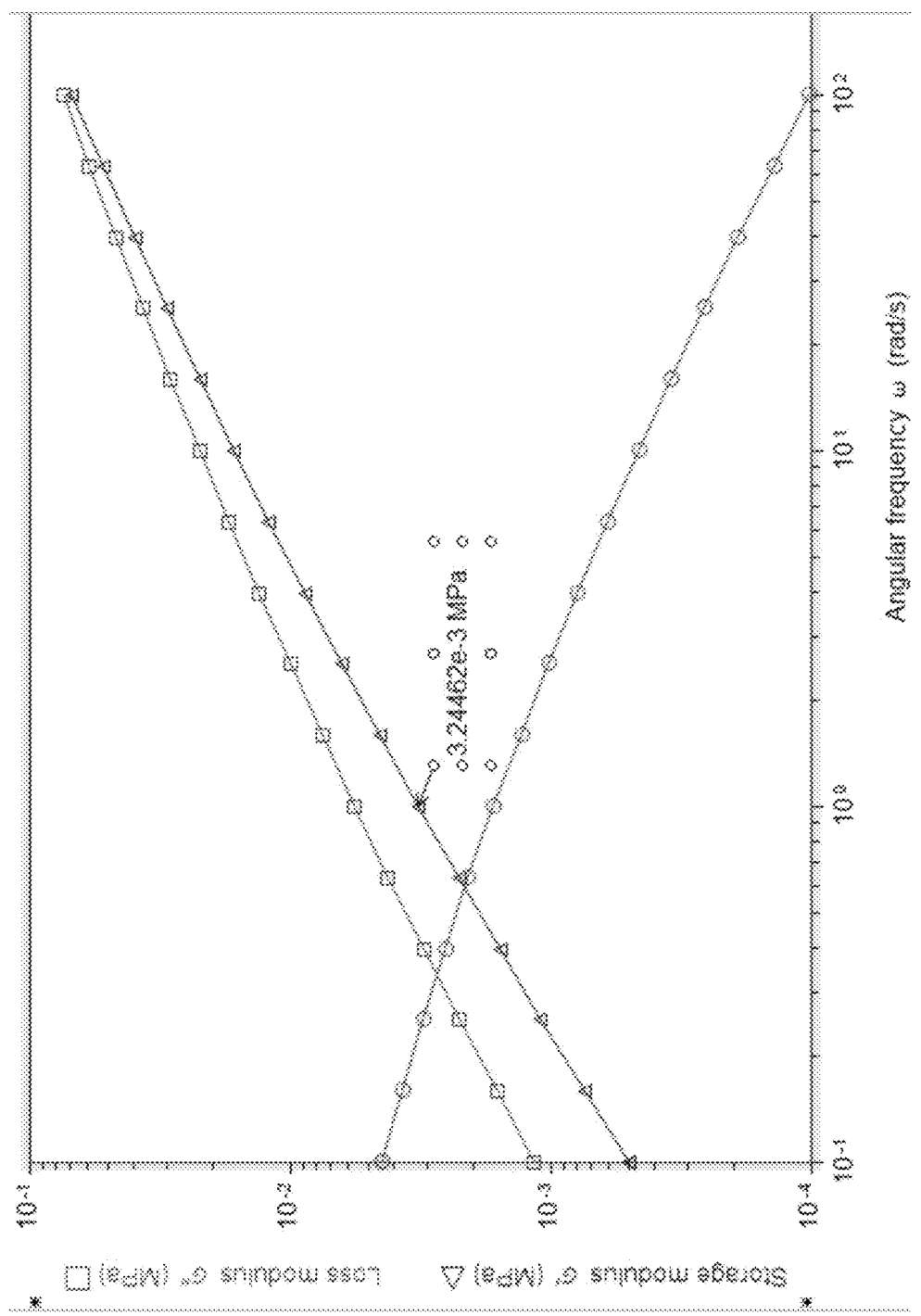
FIG. 3 shows the rheological analysis (frequency sweep) of a home compostable pressure sensitive adhesive described herein.

The viscoelastic properties of a polymer directly relate to the materials ability to function as an adhesive. It has been shown that a material with a storage modulus less than 0.3 MPa at 1 Hz has the appropriate elastic and viscous properties to be a pressure sensitive adhesive. The polymeric system we formulated meets this baseline (FIG. 3).

Figure 4:
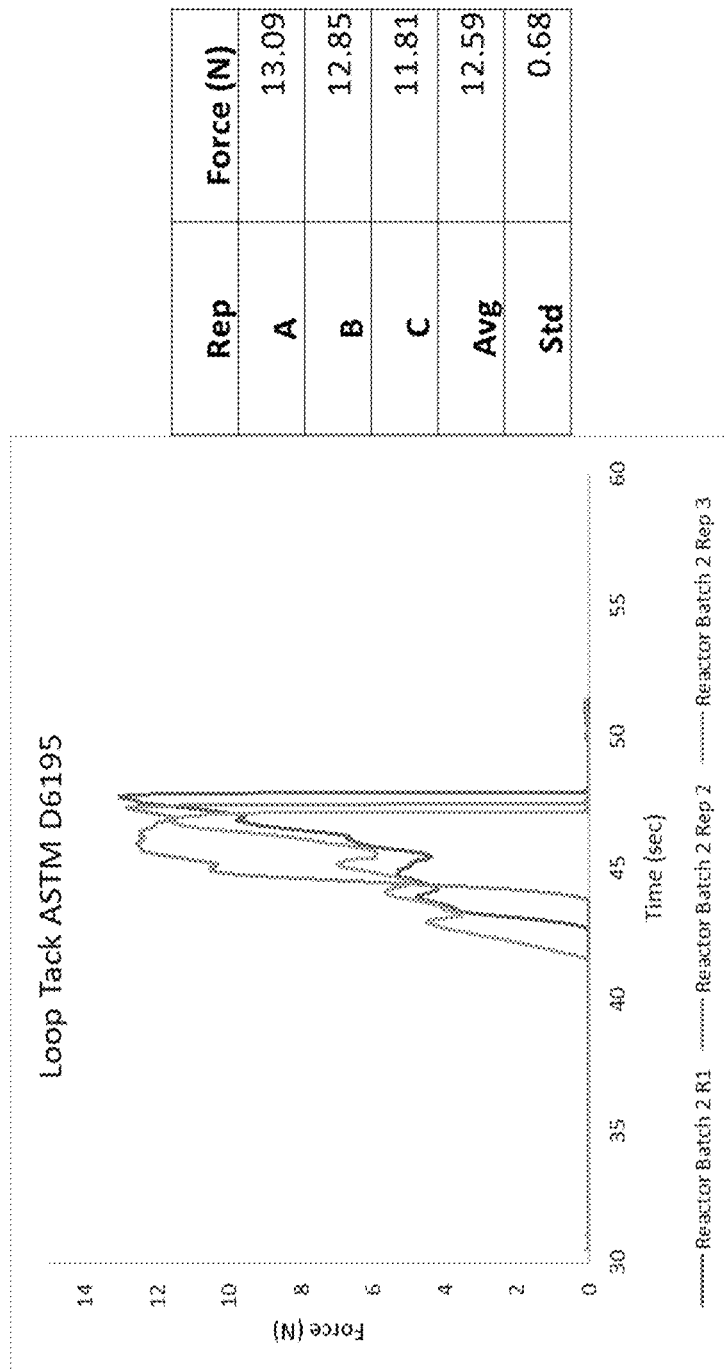
FIG. 4 shows the loop tack testing of a home compostable pressure sensitive adhesive described herein.

The adhesive properties of the polymeric material developed was measured following the ASTM D6195 standard for loop tack testing. This method measures the instant tack that an adhesive provides. The determined adhesive properties for the test material are comparable to current non-biodegradable PSAs used for tapes and labels (FIG. 4).

It should be emphasized that the above-described embodiments of the present disclosure are merely possible examples of implementations and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The invention claimed is:

1. A home compostable adhesive comprising a polyester, wherein the polyester consists of
   (a) a plurality of residues of a diol selected from the group consisting of 1,3-propanediol, 1,4-butanediol, or a combination thereof;
   (b) a plurality of residues of a first dicarboxylic consisting of succinic acid;
   (c) a plurality of residues of a second dicarboxylic consisting of glutaric acid; and
   (d) a plurality of residues of a sugar;
       wherein the molar ratio of the first dicarboxylic acid to the second dicarboxylic acid is from 1:1 to 1:5.

2. The adhesive of claim 1, wherein the diol is a combination of 1,3-propanediol and 1,4-butanediol.

3. The adhesive of claim 2, wherein the molar ratio of the 1,4-butanediol to 1,3-propanediol is from 4:1 to 7:1.

4. The adhesive of claim 1, wherein the molar ratio of the sum of the first dicarboxylic acid and the second dicarboxylic acid to the diol is from 1:10 to 1:1.

5. The adhesive of claim 1, wherein the sugar is present in an amount of a greater than 0 mole percent to 15 mole percent hydroxyl content.

6. The adhesive of claim 1, wherein the sugar is a sorbitan or a fatty acid derivative thereof.

7. The adhesive of claim 1, wherein the sugar is sorbitan monooleate, sorbitan monolaurate, sorbitan monostearate, sorbitan monopalmitate, sorbitan, fructose, mannose, xylose, or any combination thereof.

8. The adhesive of claim 1, wherein the diol is 1,4-butanediol and 1,3-propanediol, the first dicarboxylic acid is succinic acid, the second dicarboxylic acid is glutaric acid, and the sugar is sorbitan monooleate.

9. The adhesive of claim 8, wherein
   the molar ratio of the 1,4-butanediol to 1,3-propanediol is from 4:1 to 7:1; and
   (b)
   the molar ratio of the sum of the first dicarboxylic acid and the second dicarboxylic acid to the diol is from 1:10 to 1:1.

10. The adhesive of claim 1, wherein the polyester has a glass transition temperature of less than 25° C.

11. The adhesive of claim 1, wherein the polyester has a crystallinity of less than 10%.

12. The adhesive of claim 1, wherein the adhesive is a pressure sensitive adhesive.

13. The adhesive of claim 1, wherein the polyester is from about 50 weight percent to about 100 weight percent of the adhesive.

14. The adhesive of claim 1, wherein the adhesive further comprises a UV absorber, an antioxidant, a viscosity modifier, a thixotropic agent, a hardener, a wax, a tackifier, a plasticizer, or any combination thereof.

15. The adhesive of claim 1, wherein the adhesive does not include a tackifier, a solvent, or an additional polymer.

16. The adhesive of claim 1, wherein the polyester consists of the reaction product of a diol selected from the group consisting of 1,3-propanediol, 1,4-butanediol, or a combination thereof, a first dicarboxylic consisting of succinic acid; a second dicarboxylic consisting of glutaric acid; and a sugar.

17. The adhesive of claim 1, wherein the adhesive consists of the polyester.

18. A label comprising at least one surface, wherein the at least one surface comprises a coating comprising the home compostable adhesive of claim 1.

19. A food packaging system comprising the label of claim 18 adhered to the system.

20. An article of food comprising the label of claim 18 adhered to the article of food.

21. A home compostable adhesive comprising a polyester, wherein the polyester consists of
   (a) a plurality of residues of a diol selected from the group consisting of 1,3-propanediol, 1,4-butanediol, or a combination thereof;
   (b) a plurality of residues of a first dicarboxylic consisting of succinic acid;
   (c) a plurality of residues of a second dicarboxylic consisting of glutaric acid; and
   (d) a plurality of residues of a sugar;
       wherein the adhesive does not include a tackifier, a solvent, or an additional polymer.

22. A label comprising at least one surface, wherein the at least one surface comprises a coating comprising the home compostable adhesive of claim 21.

23. A food packaging system comprising the label of claim 22 adhered to the system.

24. An article of food comprising the label of claim 22 adhered to the article of food.

25. A home compostable adhesive consisting of a polyester, wherein the polyester consists of
   (a) a plurality of residues of a diol selected from the group consisting of 1,3-propanediol, 1,4-butanediol, or a combination thereof;
   (b) a plurality of residues of a first dicarboxylic consisting of succinic acid;
   (c) a plurality of residues of a second dicarboxylic consisting of glutaric acid and
   wherein the adhesive consists of the polyester.

26. A label comprising at least one surface, wherein the at least one surface comprises a coating comprising the home compostable adhesive of claim 25.

27. A food packaging system comprising the label of claim 26 adhered to the system.

28. An article of food comprising the label of claim 26 adhered to the article of food.

* * * * *